United States Patent
Barbir et al.

(10) Patent No.: US 8,429,221 B2
(45) Date of Patent: Apr. 23, 2013

(54) CONTENT REQUEST ROUTING METHOD

(75) Inventors: Abdulkadev Barbir, Ottawa (CA);
Nicholas C. Bennett, Ottawa (CA);
Nalin N. Mistry, Nepean (CA)

(73) Assignee: Rockstar Consortium US LP, Plano, TX (US)

( * ) Notice: Subject to any disclaimer, the term of this patent is extended or adjusted under 35 U.S.C. 154(b) by 1821 days.

(21) Appl. No.: 10/013,677

(22) Filed: Dec. 13, 2001

(65) Prior Publication Data

US 2003/0115283 A1    Jun. 19, 2003

(51) Int. Cl.
*G06F 15/16* (2006.01)
*G06F 15/173* (2006.01)

(52) U.S. Cl.
USPC ........... 709/203; 709/218; 709/226; 709/238; 709/249

(58) Field of Classification Search .................. 709/203, 709/218, 226, 238, 249
See application file for complete search history.

(56) References Cited

U.S. PATENT DOCUMENTS

| | | | | |
|---|---|---|---|---|
| 5,224,205 A * | 6/1993 | Dinkin et al. | .................. | 709/226 |
| 6,055,561 A * | 4/2000 | Feldman et al. | .............. | 709/200 |
| 6,415,323 B1 * | 7/2002 | McCanne et al. | ............ | 709/225 |
| 6,529,958 B1 * | 3/2003 | Oba et al. | ....................... | 709/237 |
| 6,597,663 B1 * | 7/2003 | Rekhter | ......................... | 370/252 |
| 6,611,872 B1 * | 8/2003 | McCanne | ..................... | 709/238 |
| 6,614,796 B1 | 9/2003 | Black et al. | | |
| 6,654,807 B2 * | 11/2003 | Farber et al. | ................... | 709/225 |
| 6,704,795 B1 * | 3/2004 | Fernando et al. | ............. | 709/237 |
| 6,785,704 B1 * | 8/2004 | McCanne | ....................... | 718/105 |
| 6,850,980 B1 * | 2/2005 | Gourlay | ........................ | 709/226 |
| 6,901,445 B2 * | 5/2005 | McCanne et al. | ............. | 709/225 |
| 2003/0088696 A1 * | 5/2003 | McCanne | ..................... | 709/238 |
| 2004/0010616 A1 * | 1/2004 | McCanne | ..................... | 709/238 |
| 2005/0010653 A1 * | 1/2005 | McCanne | ..................... | 709/219 |

OTHER PUBLICATIONS

Internet Draft by Y. Ohba et al., "MPLS Loop Prevention Mechanism" (draft-ohba-mpls-loop-prevention-02.txt), Nov. 1998.*
Internet Draft by Y. Ohba et al., "MPLS Loop Prevention Mechanism" (draft-ohba-mpls-loop-prevention-02.pdf), Nov. 1998.*

* cited by examiner

*Primary Examiner* — David Lazaro
*Assistant Examiner* — Vitali Korobov
(74) *Attorney, Agent, or Firm* — Withrow & Terranova, PLLC

(57) ABSTRACT

A method of redirecting content requests among content distribution network peers. In operation, a client sends a request for content to a content distribution network (CDN). When this CDN does not currently have the capacity to deliver the content, the CDN refers to one or more content distribution tables to see if the neighbor peers are able to provide this content. The content distribution table is populated at the time of distribution of the content. When the neighbor peer has this content, the request is redirected to the neighbor peer. In redirecting request, an address of the neighbor peer is appending to the previous address such that each peer receiving the request knows where the request came from and where it has been previously.

4 Claims, 5 Drawing Sheets

Fig. 4a

| CDN A DISTRIBUTION TABLE ||
| CDN Peers | Content α β γ δ ε |
|---|---|
| CDN B | X – X X X |
| CDN D | X X – – X |

| CDN B DISTRIBUTION TABLE ||
| CDN Peers | Content α β γ δ ε |
|---|---|
| CDN A | X – X X – |
| CDN C | – X – X – |
| CDN D | X X – – X |
| CDN E | – – X X X |

| CDN D DISTRIBUTION TABLE ||
| CDN Peers | Content α β γ δ ε |
|---|---|
| CDN A | X – X X – |
| CDN D | X – X X X |
| CDN E | – – X X X |

142

CONTENT REQUEST ROUTING METHOD

FIELD OF THE INVENTION

The present invention relates to content request routing and is particularly concerned with routing between content network peers.

BACKGROUND OF THE INVENTION

A current Internet draft "Known Mechanisms for Content Internetworking" by F. Douglas et al. provides a useful overview of content internetworking. (Nov. 8, 2001) The use of "Intelligent DNS (IDNS) is discussed as a way to handle request redirection.

Content networks play an important role in the overall architecture of the web.

In the Internet today several approaches have been proposed for providing infrastructure, at layers 4 through 7, to get content to end users or user agents in a scalable, reliable, and cost-effective fashion. In this regard, various protocols and appliances have been developed for the location, download, and usage tracking of content. Examples of such technologies include: web caching proxies, content management tools, and intelligent web switches.

In general, a content network can be viewed as a virtual content overlay network in the OSI stack. This content overlay layer enables the delivery of richer services that rely on underlying elements from all 7 layers of the stack to subscribers or end users. Content overlay services rely on layer 7 protocols such as HTTP or RTSP for transport.

However, regardless of the size of a content network, its ability to serve clients and subscribers is limited by economic realities and other factors. Hence, in order to increase the scale, reach and performance of content networks, it is possible to interconnect them. Hence, content internetworking is the interconnection of multiple content networks. In the networking field, content internetworking is also known as content distribution internetworking or content peering.

Content internetworking allows different content networks to cooperate to serve content to end users or user agents. This leads to the ability of content networks to share resources so as to provide larger scale and/or reach to each participant than they could otherwise achieve. In order to be able to interconnect content networks, various architectural components must be introduced. In particular, the interconnection of content networks is achieved through the establishment of common internetworking gateway. The gateway must be able to provide mechanisms to distribute content or inject content into the networks and must also be able to direct user requests between them. The task of directing users requests to various surrogates among the inter-networked content networks is also called request routing and it is done in a content router. It is also possible to define various accounting and authorization schemes for financial settlements. In the literature, a content router is also called a request routing system (RRS).

There are various request routing techniques that could be used within a content router to direct users request for content among internet-worked content networks. At a high-level, these may be classified under: DNS request-routing, transport-layer request-routing, and application-layer request-routing. However, regardless of the technique that is used for request routing, there should exist mechanisms within the content router that insures that the task of directing users requests is performed in a loop free manner.

Among the various request routing techniques, the use of DNS based mechanisms has gained popularity due to the ubiquity of DNS as a directory service. In DNS based request-routing techniques, the content router acts as a specialized DNS server that is inserted in the DNS resolution process. The content router is capable of returning a different set of A, NS or CNAME records based on defined policies, network conditions and cost. Such DNS servers have also been called Intelligent DNS servers (IDNS). In general, within IDNS, the use of CNAME redirection techniques is the preferred method of request routing.

Referring to FIG. 1 there is illustrated in a block diagram an internetworking of a plurality of content distribution networks (CDN). In general, an intelligent DNS (IDNS) system uses a DNS server 18, to redirect, typically via the DNS CNAME response, to an IDNS brokering server 20 within a selected CDN, for example CDNB 16. The brokering DNS server 20 monitors the load of other CDNs, CDNC 26, and CDNA 30 within a set of predefined "regions" (e.g., individual countries). Using the IP address of the DNS server 14 making a request, the IDNS brokering server 20 maps the DNS server 14 to a region and selects the CDN that serves that region "best" based on various metrics, for example CDNC 26.

The IDNS brokering server 20 uses CNAME or NS redirection to other CDNs, or it can forward the DNS request directly to a CDN that will respond to the request directly (not shown in FIG. 1). For example, a client 12 initially contacts (1) its local DNS server 14, which (2) contacts the IDNS brokering server 20, via a DNS server 18. The IDNS brokering server 20 (3) returns either (A) a CNAME or NS record redirecting to another CDN, e.g. GDNC 26, or (B) an A record for an edge server 22 within CDNB 16. (The latter is called a "triangular resolution".) Eventually, (4) an IP address is returned to the client 12, which then requests (5) the control from server 28 and receives (6) the actual content.

Request-routing systems (RRS) present a "black-box" view of their associated distribution systems. Since in such an environment no CDN possesses a global view of all other CDNs, the request-routing system has to rely on a peer-to-peer model in which each request-routing system is only aware of its direct neighbor.

There are two known methods for redirecting a request between two interconnected request-routing systems. The first method is an interactive method where a RRS directs the request to the next-best (neighbor) RRS. This continues until a surrogate is finally selected. The second method is recursive where a RRS directs a request to the next-best RRS but expects an answer to return to the client. These two methods are analogous to recursive vs. iterative DNS lookups.

The interactive approach will either find a CDN that will accept the request or it will return a request failed message. With either result, considerable resources are involved with the messaging that is exchanged in this process.

Referring to FIG. 2 there is illustrated a typical exchange for four content delivery networks. A client 40 makes a request via its local access provider that is routed to RRS 42. The RRS 42 then relays the request to a CDNA 44, who refuses the request. The RRS 42 next relays the request to a CDNB 46, who refuses the request. The RRS 42 next relays the request to a CDNC 48, who accepts the request. RRS 42 then provides the client with the DNS of CDNC 48 via its local access provider.

A second method of request redirection is recursive. Here the RRS redirects a request to the next best RRS, but expects the new RRS to return a reply to the client. Either of these methods will work if there is one level of peering. However, if there are multiple levels of peering, these simple redirection schemes may lead to looping, where the request continues to be past among the CDN peers without converging on a CDN that will accept the request.

SUMMARY OF THE INVENTION

An object of the present invention is to provide an improved content request routing method.

Accordingly, the present invention defines peering levels at distribution of content from a content source then tags each redirection of requests with an identifier of the CDN forwarding the request to a peer. Advantageously, the peers only require knowledge of nearest neighbours.

Conveniently, a content by CDN matrix is populated at the time of distribution.

BRIEF DESCRIPTION OF THE DRAWINGS

FIGS. 4a, 4b, and 4c illustrate content distribution tables for nearest peers in accordance with an embodiment of the present invention.

DETAILED DESCRIPTION OF THE PREFERRED EMBODIMENT

Figure 1:
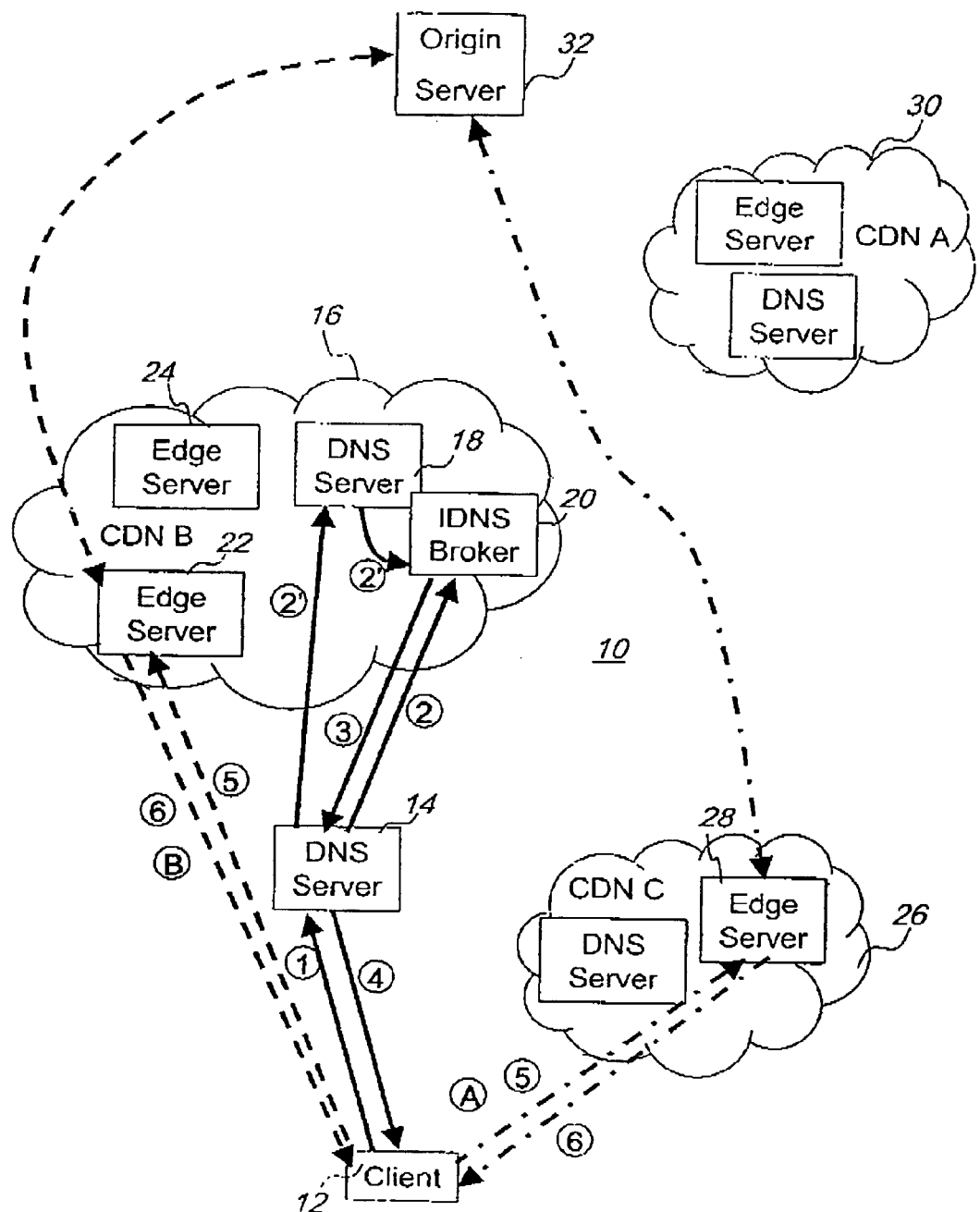
FIG. 1 illustrates in a block diagram a known internetworking of a plurality of content distribution networks.
Figure 2:
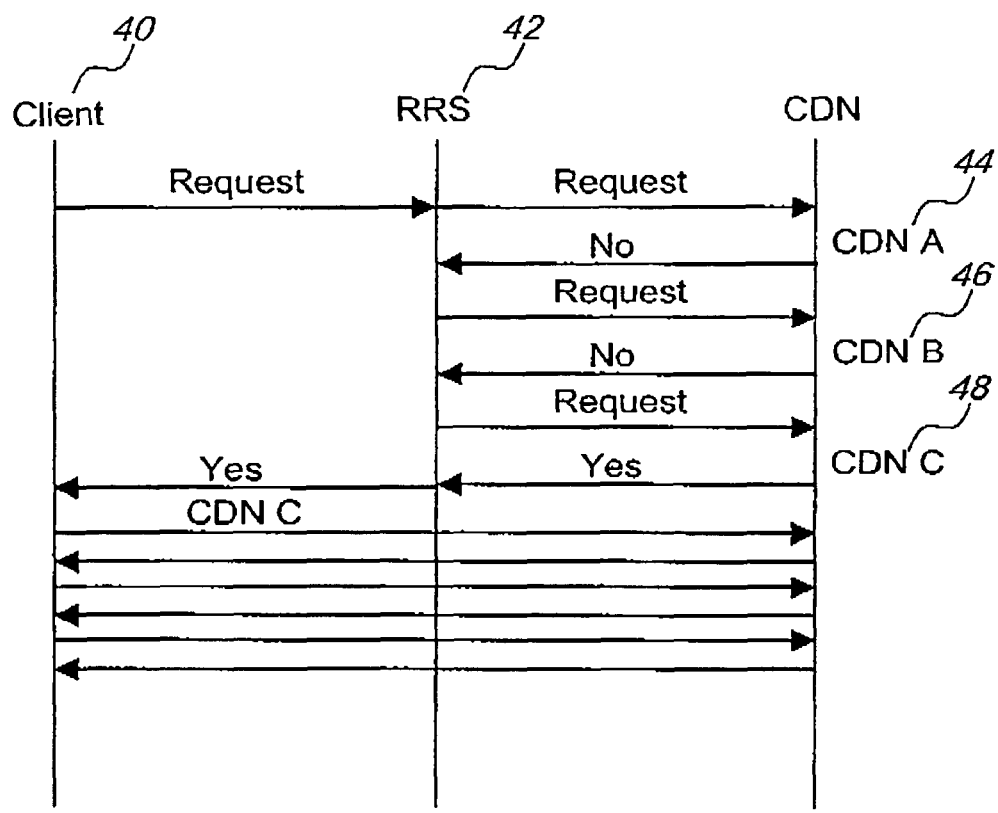
FIG. 2 illustrates a message exchange for request redirection in the internetworking of FIG. 1.
Figure 3:
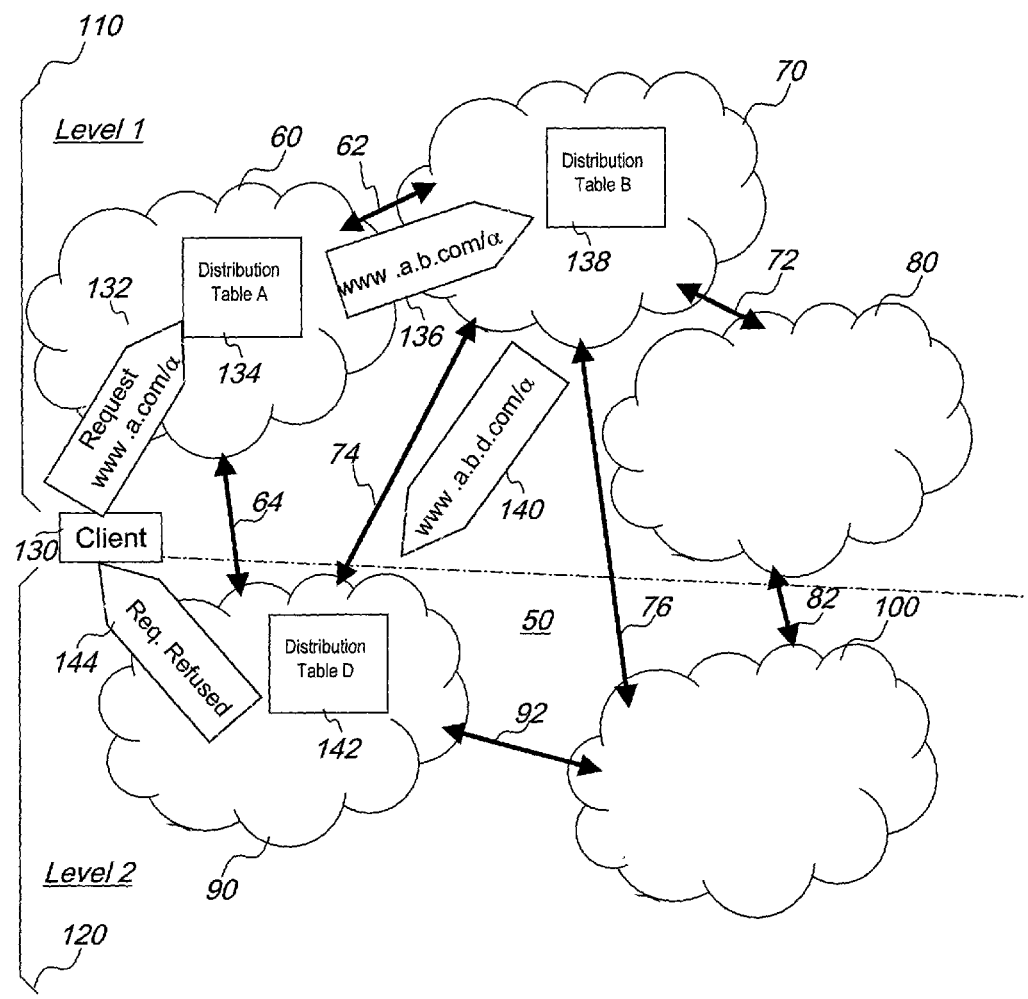
FIG. 3 illustrates an ordered peering of CDN using a method of request redirection in accordance with an embodiment of the present invention.

Referring to FIG. 3 there is illustrated an ordered peering of content distribution networks (CDN) using a method of redistribution in accordance with an embodiment of the present invention. The ordered peering 50 includes content distribution network (CDN), CDNA 60, CDNB 70, CDNC 80, CDND 90, CDNE 100 ordered in peer levels L1 110 and L2 120. Each CDN is coupled to its nearest peer hence CDNA 60 is coupled via 62 its level 1 peer CDNB 70 and via 64 to its level 2 peer CDND 90. Similarly, CDNB 70 is coupled via 72 to its level 1 peer CDNC 80 and to its level 2 peers CDND 90 and CDNE 100, via 74 and 76, respectively. And CDNC 90 is coupled to a level 2 peer CDNE 100 via 92.

In operation, a client 130 sends a request 132 addressed {www.a.com/α} for content α to CDNA 60. However, CDNA 60 does not currently have the capacity to deliver this content. So it refers to its content distribution table 134 to see if the neighboring peers are able to provide this content. The CDNA 60 sees that it has a level 1 peer, CDNB 70 that has the α content and forwards the request to CDNB 70 addressed {www.a.b.com/α}.

The CDNB 70 is also too busy to handle the request and determines from its distribution table 138 that its level 1 peer CDNC 80 does not have the content α, however its level 2 peer CDND 90 does. In this case, the CDNB 70 forwards the request 140 addressed, www.a.b.d.com/α, to the CDND 90. The CDND 90, is also too busy to handle the request so consults its distribution table 142 and determines that the only two peers having content α are CDNA 60 and CDNB 70, but the address ww.a.b.d.com/α shows that these two peers have already refused the request. At this point CDND 90 returns a network busy request refused message 144 to the client 130.

Referring to FIGS. 4a, 4b, and 4c, there is illustrated the content distribution tables of CDN A, B, and D, respectively of FIG. 3. Each distribution table is populated at the time of distribution of the content. Also at the time of content distribution, peering levels are established. In the present example only two levels, level 1 and level 2, are shown. Also for convenience the content distribution tables show a single table for a plurality of different content. Various implementations of content tables are possible. For example content tables could include all content from a particular content source. Alternatively, a table could exist for each content.

In the example above, the initial CDN peer was CDNA. If the CDN peer had been CDN B, the addressing of the re-routed request would be www.b.nextpeer.com. Hence, the re-routed request has the general form:

www.<1stpeer>.<next peer>.<peer of next peer>.com.

Figure 5:
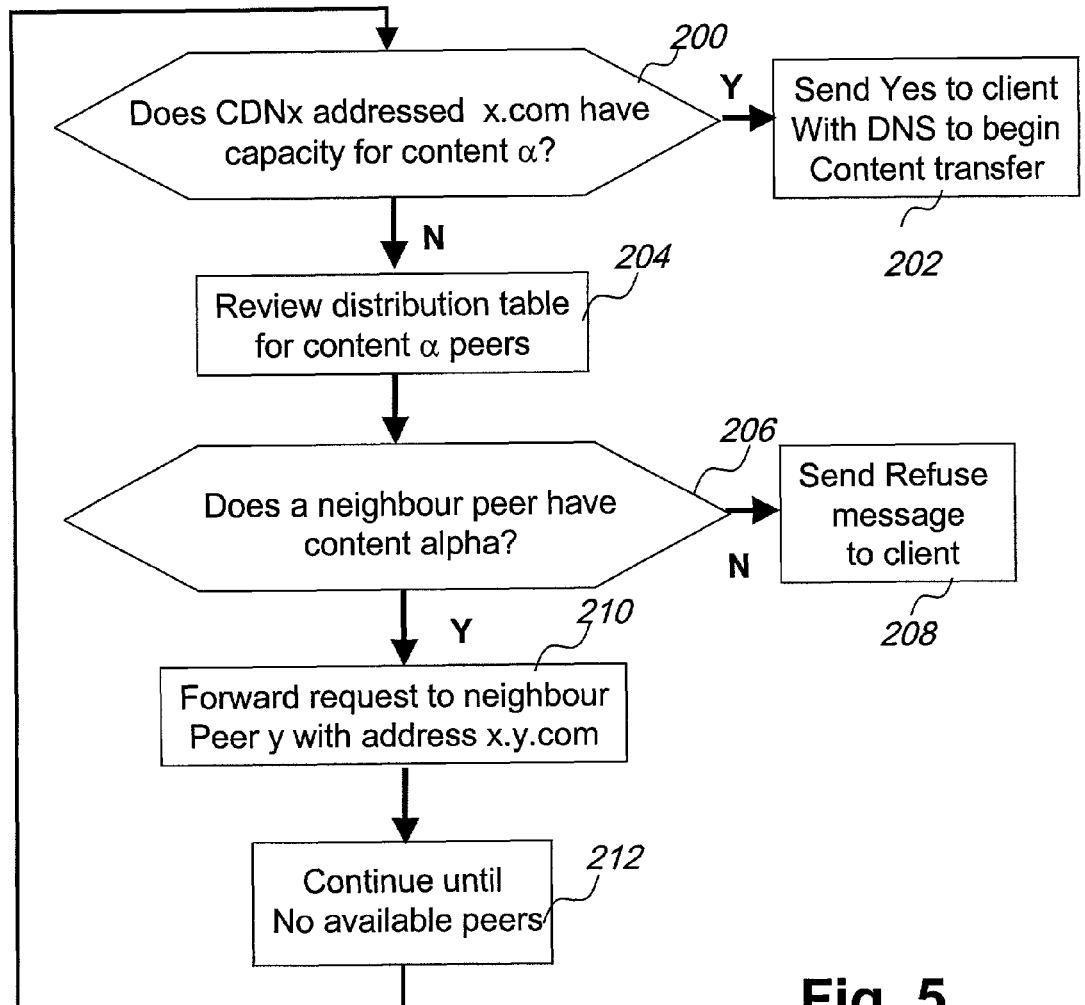
FIG. 5 illustrates in a flow chart the method of request redirection in accordance with an embodiment of the present invention.

Referring to FIG. 5, there is illustrated in a flow chart the request redirection method in accordance with an embodiment of the present invention. The method begins with a decision block 200 asking whether the address CDN has capacity to fill the content request. If YES, a process block 202 sends an affirmation reply to the client and content transfer begins. If NO, a process block 204 reviews a distribution table to determine what peer has the requested content. A decision block 206 determines if a neighbour peer has content a. If no neighbor peer has the content, a refuse request message is sent to the client, as represented by a process block 208. If a neighbor peer is found to have the content, the request is forwarded, as represented by a process block 210, appending the peers address to the previous address. In this way, each peer receiving the request knows where the request came from, and where it has been previously. This becomes increasingly important as the number of redirections required increases and as the number of peer levels increase.

What is claimed is:

1. A method of redirecting content requests among content distribution network peers comprising:

establishing, for each content distribution network peer at the each content distribution network peer, a corresponding content distribution table that identifies a plurality of neighbor content distribution network peers, and content contained on each of the plurality of neighbor content distribution network peers;

receiving, at a first content distribution network peer, a content request comprising an address of the first content distribution network peer, and an identification of requested content, wherein the first content distribution network peer has the requested content;

making a determination that the first content distribution network peer lacks capacity to provide the requested content;

referring, based on the determination, to the corresponding content distribution table to find a first neighbor content distribution network peer of the plurality of neighbor content distribution network peers that has the requested content;

generating a uniform resource locator including a domain name portion, wherein the domain name portion comprises a domain name associated with the first neighbor content distribution network peer appended to a domain name associated with the first content distribution network peer; and redirecting, by the first content distribution network peer, the content request to the first neighbor content distribution network peer using the uniform resource locator.

2. A method of redirecting content requests as claimed in claim 1 wherein redirecting includes encoding a node with a content path for the node.

3. A method of redirecting content requests as claimed in claim 2 wherein the node is returned by a RRS system.

4. A content distribution peer, comprising:

a memory comprising a content distribution table that identifies a plurality of neighbor content distribution peers, and content contained on each of the plurality of neighbor content distribution peers; and a processor coupled to the memory, the processor configured to:

receive a content request comprising a first destination address that identifies the content distribution peer, and an identification of requested content, wherein the content distribution peer has the requested content;

make a determination that the content distribution peer is unable to service the content request at the content distribution peer;

access the content distribution table to find a first neighbor content distribution peer of the plurality of neighbor content distribution peers that has the requested content, in response to the determination;

generate a uniform resource locator including a domain name portion, wherein the domain name portion comprises a domain name associated with the first neighbor content distribution peer appended to a domain name associated with the content distribution peer; and redirect the content request to the first neighbor content distribution peer using the uniform resource locator.

\* \* \* \* \*